J. MERRITT.
MEANS FOR STRINGING TOBACCO LEAVES.
APPLICATION FILED MAR. 24, 1911.
1,076,901.
Patented Oct. 28, 1913.
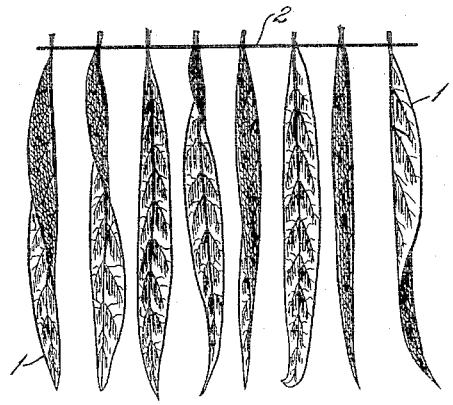
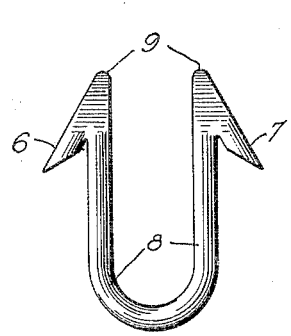
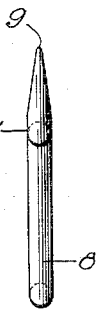
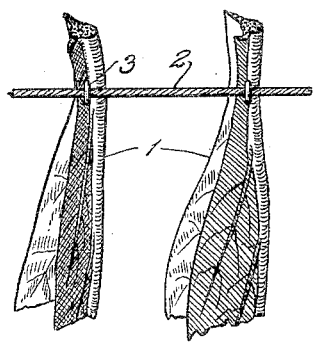
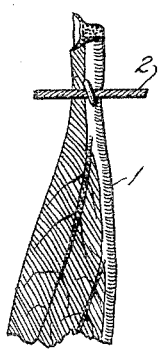
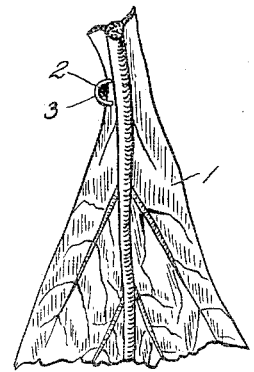
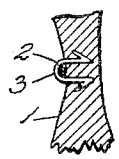
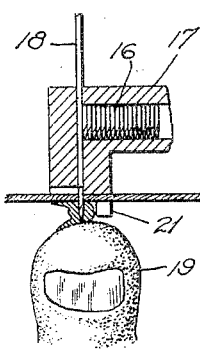
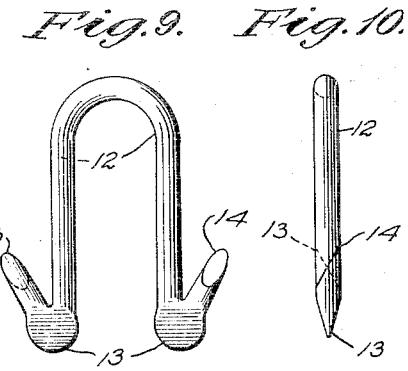
Witnesses:
S. S. Grotta
E. H. Lorenz
Inventor:
Joseph Merritt
by Wm H Honiss
Atty.

UNITED STATES PATENT OFFICE.

JOSEPH MERRITT, OF HARTFORD, CONNECTICUT, ASSIGNOR OF ONE-HALF TO ERNEST WALKER SMITH, OF HARTFORD, CONNECTICUT.

MEANS FOR STRINGING TOBACCO-LEAVES.

1,076,901.   Specification of Letters Patent.   Patented Oct. 28, 1913.

Application filed March 24, 1911. Serial No. 616,584.

*To all whom it may concern:*

Be it known that I, JOSEPH MERRITT, a citizen of the United States, residing at Hartford, in the county of Hartford and State of Connecticut, have invented new and useful Improvements in Means for Stringing Tobacco-Leaves, of which the following is a specification.

This invention relates to improved means for stringing the leaves of tobacco and similar plants to facilitate hanging them during the process of curing the leaves, and for convenience in handling, prior to and after the curing operation.

This invention, although applicable to the stringing of leaves of various plants, is herein described as applied to the stringing of tobacco leaves.

Formerly it was the general custom to hand up the tobacco plant in its entirety, for the curing operation. But the method now increasing in favor is to remove the leaves separately from the standing stalk, taking them in succession, as they become properly matured. By this method as now generally practised, the separate leaves are strung upon twine, using a needle, by means of which the end of the twine is carried directly through the butt ends of the successive leaf stems. For convenience in handling these strings, and keeping them extended, the ends of the twine are attached to the ends of strips of wood, ordinary lath being generally used for this purpose. The strings thus extended are hung up in a curing shed, the ends of the lath being supported on cross poles or joists, the distance between the separate leaves and between the different strings of leaves being suitable for allowing a proper circulation of air. This method of stringing, by passing the end of the twine through the successive leaves necessitates drawing the leaves along the twine to their respective spaced positions, besides involving the subsequent tying of the free end of the twine to the end of the lath, after completing the string of leaves.

The present invention enables the wire or twine to remain secured at both ends to the ends of the leaves during the stringing operation, and enables each leaf to be at once placed in its final position on the string, in accordance with the desired spacing. This improved method also lends itself more readily to the employment of machinery of various kinds for performing the stringing operation.

In the present invention, a metallic staple is employed, provided with bars, which are pushed into, but not through the leaf stem, the barbs becoming embedded in the stem and serving to prevent the retraction of the staple, and the consequent falling of the leaf. If desired, the staples may be first applied to the leaf and a string or wire subsequently threaded through the eye of the staple; but I prefer, as herein shown, to apply the staple to the leaf with the staple astride the suspending string or wire, thereby enabling the leaves to be attached one after the other along a string or wire, whose ends are first firmly secured to the ends of a lath or other extending means.

The object of the invention is to provide a very simple and cheap staple which is so constructed that it can be easily inserted into the leaf stem in such manner as to securely hold the leaf from danger of dropping off after it becomes dry and shrunken.

Figure 1 of the drawings is a side elevation in reduced scale, of a string of leaves illustrating the method of stringing and hanging them in rows. Fig. 2 is a similar view in enlarged scale of the butt ends of the leaves, showing them attached to a string or wire in accordance with the present invention. Fig. 3 is a similar side view, illustrating a modified application of the staple. Fig. 4 is a plan view illustrating the stringing operation of the present invention. Fig. 5 is an end view projected from Fig. 3. Fig. 6 is a similar view in cross-section taken on the line 6 of Fig. 2, showing the barbs of the staple embedded in the leaf stem. Fig. 7 is a side view and Fig. 8 an edge view of an improved eye or staple for attaching the leaves to the wire or string. Fig. 9 is a side view, and Fig. 10 an edge view of a modified form of staple.

As shown is Figs. 1, and 2, the leaves 1 are strung upon a suitable string or wire or twine 2, being separated from each other at a suitable distance to allow of the proper circulation of air between the leaves when hung in the shed or loft for the curing operation. Each leaf is attached to the string or wire by means of a metallic staple 3, the legs or prongs of which are astride of the string 2 and penetrate the leaf stem near the butt end thereof, as shown in Figs. 5 and 6, preferably without projecting from the other side of the stem, as shown in section in Fig. 6. It is, however, important to provide for securing the staple in or to the leaf stem, so as to prevent the withdrawal thereof, due to the subsequent withering and shrinking of the leaf, which would allow the leaves to fall away from the string to the ground, and thus be damaged or destroyed. If the ends of the staple are allowed to project through the leaf stem, they are liable to tear the delicate leaves when the latter are bunched together, after the curing operation, besides being also liable to injure the fingers of the leaf handlers. Even if the ends of the staples, after passing through the leaf stem are clenched on the other side thereof while the stem is green and plump, the subsequent withering and shrinking of the stem is liable to carry it away from the clenched points, leaving them exposed sufficiently to tear the leaves or injure the operator's hands. The method of the present invention, by embedding the barbs or spurs within the structure of the leaf stem itself, thereby secures that portion of the staple to the stem, so that any subsequent shrinkage centers at the spurs or barbs and tends to bind the stem still more firmly to this portion of the staple, due to the entangling of the barbs or spurs with the fibers of the stem. These staples may be made in various forms. The drawings illustrate two forms, both made from round wire, and each provided with two barbs or spurs, which are made by bending back the ends of the staples. In both of the instances shown, the barbs are formed in the plane of the staple to facilitate handling them in a magazine or feed tube. Obviously, however, the barbs may be turned on any side of the wire, so as to lie in different planes from each other and from the loop or body of the staple.

In the form shown in Figs. 7 and 8, the barbs 6 and 7 are turned outwardly in the plane of the loop portion 8 of the staple, so that a number of these staples would lie flatly against each other in a magazine or feed tube, as shown in Fig. 4. The points of the barbs may be more or less acute, according to the inclination at which the wire is cut off, and the inclination of the cut may be changed, or the wire turned for the alternate cuts, so as to dispose the barbed points symmetrically on opposite sides of the staple, as shown in Fig. 7. Obviously, the cutting and disposal of these barbs may be greatly varied.

In Figs. 9 and 10 is shown a form of staple in which the wire may be cut at an unchanged inclination, the barbs in that case being bent in such a relation to the loop or body portion 12 as to face the points of the barbs 13 and 14 in opposite directions, as best seen in Fig. 10. In both of the forms shown, the inclined barbs resist retractive movement of the staples, by becoming entangled with the fibers or tissues of the plant; and this tendency is increased by thus pointing the barbs in different directions.

The staples may be inserted with their prongs parallel to the leaf stem, as shown in Fig. 2, or may be inclined across the fibers, as shown in Fig. 3.

The leading ends of the staples may be sharpened by swaging or otherwise, so as to make the points suitable for easy penetration of the leaf stems. These ends may have round or square points, like a pin or nail, as illustrated by the points 9 in Figs. 7 and 8; or they may be of a flattened hatchet shape, as illustrated by the ends 13 in Figs. 9 and 10. Thus in many ways, the form of the staple, the disposal of the barbs, and the shape of their points, may be varied to suit different conditions of service, or to adapt them to different methods of manufacture and use. These staples may be made from a coil of wire, by staple forming mechanism, adjunctive to the machinery used for stripping the leaves. Or the staples may be separately manufactured and fed from a magazine through a suitable feed tube to their point of application to the leaf.

My improved method of stringing leaves by means of these staples is illustrated in Fig. 4. The staples 16 pass through a feed tube 17 from the staple forming mechanism, or from any suitable magazine or loading device. Each leading staple of the advancing column is in turn separated from the rest by a plunger 18, and pushed through a raceway across the end of which the string or wire 2 is guided, so that the staple as it is pushed forward by the plunger will pass astride the string, leaving the string in the loop or eye of the staple, as shown in Figs. 5 and 6. The leaf stem, held by the thumb or finger 19 of the operator, is pushed against the leading ends of the staple, or the leaf may be placed first, and the staple be pushed forward into the stem by the plunger. In either case the staple penetrates the leaf stem as shown in Fig. 6. A suitable guide pin or shoulder 21 may be employed to aid the operator in quickly placing the leaf stem in desired position relative to the path of the staple. To guard against possible penetration of an unusually thin stem, the thumb or finger of the operator may be protected by a suitable pad or glove, or thimble, which may be of metal or other substance sufficiently hard to resist penetration by the staple, so as to keep those points from coming through beyond the surface of the leaf stem. After each leaf is thus attached to the string, the latter is advanced a suitable distance for the desired separation between the leaves, and another staple for the succeeding leaf is brought forward. The movements of the string 2 and of the plunger 18 may be imparted manually, or they may be included in the movements of a more or less automatic machine.

I claim as my invention:—

A staple for hanging tobacco leaves, consisting of a U-shaped body of fine flexible metallic wire with the ends of the body turned outward and backward at acute angles with relation to the sides of the body and providing flexible barbs, the metal at the turns being beveled to facilitate the entrance of the body and barbs into the tobacco stems and the ends of the barbs being beveled in opposite directions to obstruct the withdrawal of the barbs from the stems.

In testimony whereof I have signed my name to this specification in the presence of two subscribing witnesses.

JOSEPH MERRITT.

Witnesses:
CAROLINE M. BRECKLE,
WM. H. HONISS.

---

Copies of this patent may be obtained for five cents each, by addressing the "Commissioner of Patents, Washington, D. C."